(12) United States Patent
Yamamoto et al.

(10) Patent No.: US 7,024,442 B2
(45) Date of Patent: Apr. 4, 2006

(54) PROCESSING APPARATUS

(75) Inventors: Yoshinobu Yamamoto, Kawasaki (JP);
Nobukazu Koizumi, Kawasaki (JP);
Atsushi Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 09/988,615

(22) Filed: Nov. 20, 2001

(65) Prior Publication Data

US 2002/0194235 A1  Dec. 19, 2002

(30) Foreign Application Priority Data

May 30, 2001 (JP) ............................. 2001-162988

(51) Int. Cl.
*G06F 15/00* (2006.01)
(52) U.S. Cl. ...................................... 708/404; 708/409
(58) Field of Classification Search ........ 708/403–404, 708/409
See application file for complete search history.

(56) References Cited

U.S. PATENT DOCUMENTS

| | | | | |
|---|---|---|---|---|
| 3,812,470 A | * | 5/1974 | Murtha et al. | 708/404 |
| 3,988,601 A | * | 10/1976 | Perry | 708/401 |
| 4,547,862 A | * | 10/1985 | McIver et al. | 708/404 |
| 6,430,587 B1 | * | 8/2002 | Orling | 708/404 |
| 6,591,284 B1 | * | 7/2003 | Brockmeyer et al. | 708/400 |
| 6,609,140 B1 | * | 8/2003 | Greene | 708/404 |
| 6,721,708 B1 | * | 4/2004 | Wang | 708/409 |

* cited by examiner

*Primary Examiner*—Tan V. Mai
(74) *Attorney, Agent, or Firm*—Arent Fox PLLC

(57) ABSTRACT

A processing apparatus includes a memory capable of storing data, a butterfly arithmetic unit for performing butterfly computation processes, and a bit-reversed order shuffle processing unit for writing results obtained by butterfly computation processes performed by the butterfly arithmetic unit at addresses in the memory after bit-reversed order shuffle instead of writing the results at addresses in the memory in processing order. The data written by the bit-reversed order shuffle processing unit are discrete fast Fourier transform results.

20 Claims, 12 Drawing Sheets

$A(0) = a''(0) + a''(1)$ $A(1) = W_2^0 \times a''(0) - a''(1) = a''(0) - a''(1)$ $X(1) = \{A(1) + A^*(7)\}/2 - jW_{16}^1\{A(1) - A^*(7)\}/2$ $X(7) = \{A(7) + A^*(1)\}/2 - jW_{16}^7\{A(7) - A^*(1)\}/2$

FIG. 8A

| DECIMAL NUMBER | | BINARY NUMBER | | |
|---|---|---|---|---|
| | | b2 | b1 | b0 |
| 0 | ⇒ | 0 | 0 | 0 |
| 1 | ⇒ | 0 | 0 | 1 |
| 2 | ⇒ | 0 | 1 | 0 |
| 3 | ⇒ | 0 | 1 | 1 |
| 4 | ⇒ | 1 | 0 | 0 |
| 5 | ⇒ | 1 | 0 | 1 |
| 6 | ⇒ | 1 | 1 | 0 |
| 7 | ⇒ | 1 | 1 | 1 |

FIG. 8B

| BINARY NUMBER | | | | DECIMAL NUMBER |
|---|---|---|---|---|
| b2 | b1 | b0 | | |
| 0 | 0 | 0 | ⇒ | 0 |
| 1 | 0 | 0 | ⇒ | 4 |
| 0 | 1 | 0 | ⇒ | 2 |
| 1 | 1 | 0 | ⇒ | 6 |
| 0 | 0 | 1 | ⇒ | 1 |
| 1 | 0 | 1 | ⇒ | 5 |
| 0 | 1 | 1 | ⇒ | 3 |
| 1 | 1 | 1 | ⇒ | 7 |

FIG. 10A

| ADDRESS | DATA |
|---|---|
| 0 | a"(0) |
| 1 | a"(1) |
| 2 | a"(2) |
| 3 | a"(3) |
| 4 | a"(4) |
| 5 | a"(5) |
| 6 | a"(6) |
| 7 | a"(7) |

FIG. 10B

| ADDRESS | DATA |
|---|---|
| 0 | A(0) |
| 1 | a"(1) |
| 2 | a"(2) |
| 3 | a"(3) |
| 4 | a"(4) |
| 5 | a"(5) |
| 6 | a"(6) |
| 7 | a"(7) |

FIG. 10C

| ADDRESS | DATA |
|---|---|
| 0 | A(0) |
| 1 | a"(1) |
| 2 | a"(2) |
| 3 | a"(3) |
| 4 | A(4) |
| 5 | a"(5) |
| 6 | a"(6) |
| 7 | a"(7) |

FIG. 10D

| ADDRESS | DATA |
|---|---|
| 0 | A(0) |
| 1 | a"(1) |
| 2 | A(2) |
| 3 | a"(3) |
| 4 | A(4) |
| 5 | a"(5) |
| 6 | a"(6) |
| 7 | a"(7) |

FIG. 10E

| ADDRESS | DATA |
|---|---|
| 0 | A(0) |
| 1 | a"(1) |
| 2 | A(2) |
| 3 | a"(3) |
| 4 | A(4) |
| 5 | a"(5) |
| 6 | A(6) |
| 7 | a"(7) |

FIG. 10F

| ADDRESS | DATA |
|---|---|
| 0 | A(0) |
| 1 | A(1) |
| 2 | A(2) |
| 3 | a"(3) |
| 4 | A(4) |
| 5 | a"(5) |
| 6 | A(6) |
| 7 | a"(7) |

FIG. 10G

| ADDRESS | DATA |
|---|---|
| 0 | A(0) |
| 1 | A(1) |
| 2 | A(2) |
| 3 | a"(3) |
| 4 | A(4) |
| 5 | A(5) |
| 6 | A(6) |
| 7 | a"(7) |

FIG. 10H

| ADDRESS | DATA |
|---|---|
| 0 | A(0) |
| 1 | A(1) |
| 2 | A(2) |
| 3 | A(3) |
| 4 | A(4) |
| 5 | A(5) |
| 6 | A(6) |
| 7 | a"(7) |

FIG. 10I

| ADDRESS | DATA |
|---|---|
| 0 | A(0) |
| 1 | A(1) |
| 2 | A(2) |
| 3 | A(3) |
| 4 | A(4) |
| 5 | A(5) |
| 6 | A(6) |
| 7 | A(7) |

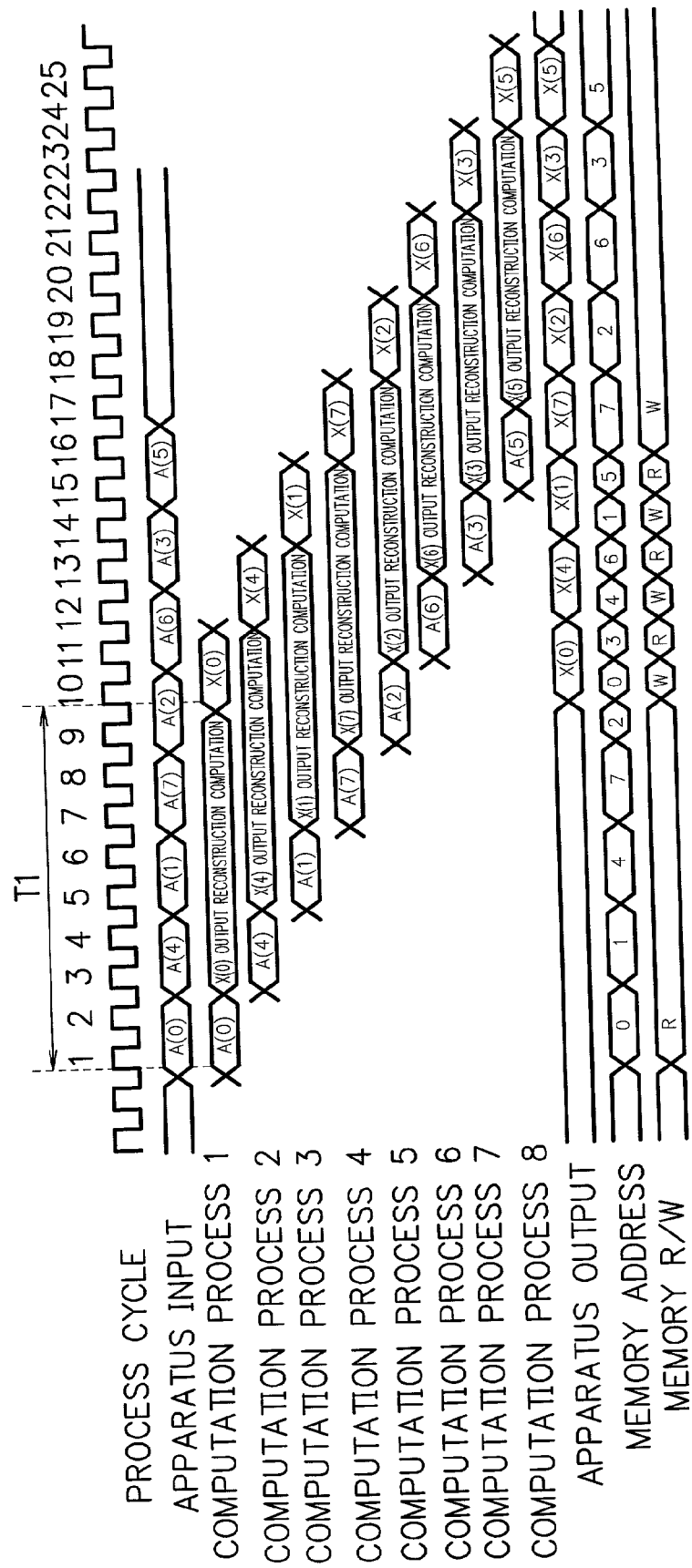

FIG. 12A

| ADDRESS | DATA |
|---|---|
| 0 | A(0) |
| 1 | A(4) |
| 2 | A(2) |
| 3 | A(6) |
| 4 | A(1) |
| 5 | A(5) |
| 6 | A(3) |
| 7 | A(7) |

FIG. 12B

| ADDRESS | DATA |
|---|---|
| 0 | X(0) |
| 1 | A(1) |
| 2 | A(2) |
| 3 | A(3) |
| 4 | A(4) |
| 5 | A(5) |
| 6 | A(6) |
| 7 | A(7) |

FIG. 12C

| ADDRESS | DATA |
|---|---|
| 0 | X(0) |
| 1 | A(1) |
| 2 | A(2) |
| 3 | A(3) |
| 4 | X(4) |
| 5 | A(5) |
| 6 | A(6) |
| 7 | A(7) |

FIG. 12D

| ADDRESS | DATA |
|---|---|
| 0 | X(0) |
| 1 | X(1) |
| 2 | A(2) |
| 3 | A(3) |
| 4 | X(4) |
| 5 | A(5) |
| 6 | A(6) |
| 7 | A(7) |

FIG. 12E

| ADDRESS | DATA |
|---|---|
| 0 | X(0) |
| 1 | X(1) |
| 2 | A(2) |
| 3 | A(3) |
| 4 | X(4) |
| 5 | A(5) |
| 6 | A(6) |
| 7 | X(7) |

FIG. 12F

| ADDRESS | DATA |
|---|---|
| 0 | X(0) |
| 1 | X(1) |
| 2 | X(2) |
| 3 | A(3) |
| 4 | X(4) |
| 5 | A(5) |
| 6 | A(6) |
| 7 | X(7) |

FIG. 12G

| ADDRESS | DATA |
|---|---|
| 0 | X(0) |
| 1 | X(1) |
| 2 | X(2) |
| 3 | A(3) |
| 4 | X(4) |
| 5 | A(5) |
| 6 | X(6) |
| 7 | X(7) |

FIG. 12H

| ADDRESS | DATA |
|---|---|
| 0 | X(0) |
| 1 | X(1) |
| 2 | X(2) |
| 3 | X(3) |
| 4 | X(4) |
| 5 | A(5) |
| 6 | X(6) |
| 7 | X(7) |

FIG. 12I

| ADDRESS | DATA |
|---|---|
| 0 | X(0) |
| 1 | X(1) |
| 2 | X(2) |
| 3 | X(3) |
| 4 | X(4) |
| 5 | X(5) |
| 6 | X(6) |
| 7 | X(7) |

F I G. 13
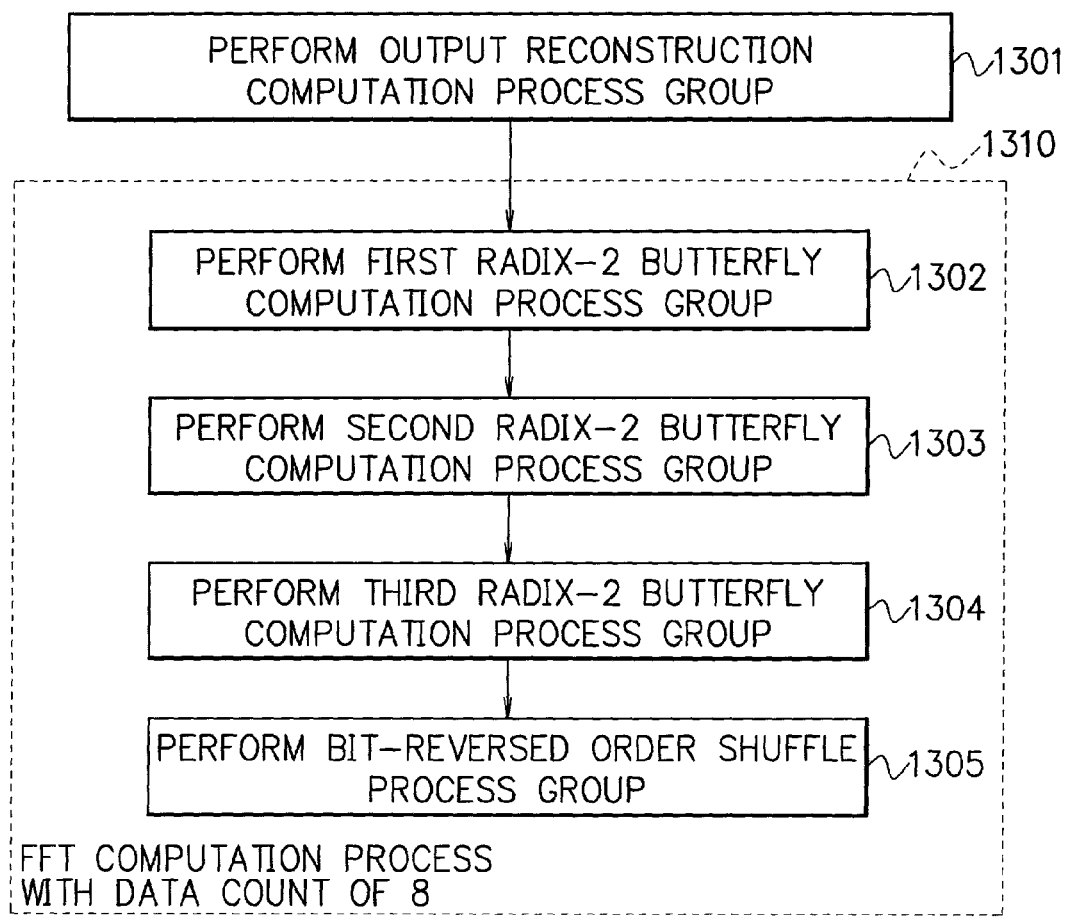

PROCESSING APPARATUS

CROSS-REFERENCE TO RELATED APPLICATIONS

This application is based upon and claims priority of Japanese Patent Application No. 2001-162988, filed on May 30, 2001, the contents being incorporated herein by reference.

BACKGROUND OF THE INVENTION

1. Field of the Invention

The present invention relates to a processing apparatus and, more particularly, to a processing apparatus which can be used in a digital signal processing apparatus such as a modem.

2. Description of the Related Art

A real discrete Fourier transform (RDFT) is known. The RDFT algorithm allows a transformation from the time axis to the frequency axis as long as all input data to be handled are real numbers.

It is generally known that a real inverse discrete Fourier transform (RIDFT) algorithm, which is the inverse transformation of the RDFT, can be obtained by executing the above RDFT algorithm in reverse order.

Conventionally, arithmetic processing apparatuses of this type include no arithmetic processing apparatus based on these RDFT and RIDFT algorithms.

SUMMARY OF THE INVENTION

It is an object of the present invention to provide a processing apparatus which can minimize the number of processing cycles up to the acquisition of a computation result with a minimum number of arithmetic units mounted.

According to one aspect of the present invention, there is provided a processing apparatus comprising a memory capable of storing data, a butterfly arithmetic unit for performing a plurality of butterfly computation processes, and a bit-reversed order shuffle processing unit for writing results obtained by a plurality of butterfly computation processes performed by the butterfly arithmetic unit at addresses in the memory after bit-reversed order shuffle instead of writing the results at addresses in the memory in processing order. The data written by the bit-reversed order shuffle processing unit are discrete fast Fourier transform results.

According to another aspect of the present invention, there is provided a processing apparatus comprising a butterfly arithmetic unit for performing a plurality of butterfly computation processes and writing results obtained by the butterfly computation processes in a memory, and a bit-reversed order shuffle processing unit for reading out the results obtained by the plurality of butterfly computation processes and written in the memory from addresses in the memory upon bit-reversed order shuffle. The data read out by the bit-reversed order shuffle processing unit are discrete fast Fourier transform results.

Assume that butterfly computation process results are written in the memory, bit-reversed order shuffle process is performed for the data in the memory, and the resultant data are written in the memory again. In this case, the processing speed decreases. According to the present invention, the processing speed can be increased by performing a bit-reversed order shuffle process at the time of a data write/read in/from the memory. In addition, since pipeline processing can be performed, the number of process cycles up to the acquisition of computation results can be decreased with a small number of arithmetic units.

BRIEF DESCRIPTION OF THE DRAWINGS

FIGS. 8A and 8B are views showing an example of a bit-reversed order shuffle process;

FIGS. 10A to 10I are views showing the contents of a memory;

FIG. 11 is a timing chart of the simultaneous execution of a bit-reversed order shuffle process group and an output reconstruction computation process group;

FIGS. 12A to 12I are views showing the contents of the memory; and

FIG. 13 is a flow chart showing a real inverse discrete Fourier transform computation process sequence.

DETAILED DESCRIPTION OF THE PREFERRED EMBODIMENTS

A processing apparatus according to this embodiment can perform a real discrete Fourier transform. The Fourier transform allows a transform from the time axis to the frequency axis. A real discrete Fourier transform (RDFT) algorithm is an algorithm capable of reducing by half the number of input data to be computed by a general fast Fourier transform (FFT) such as a decimation-in-time or decimation-in-frequency algorithm, i.e., reducing the computation amount almost by half, as long as all the input data to be handled are real numbers.

Figure 1:
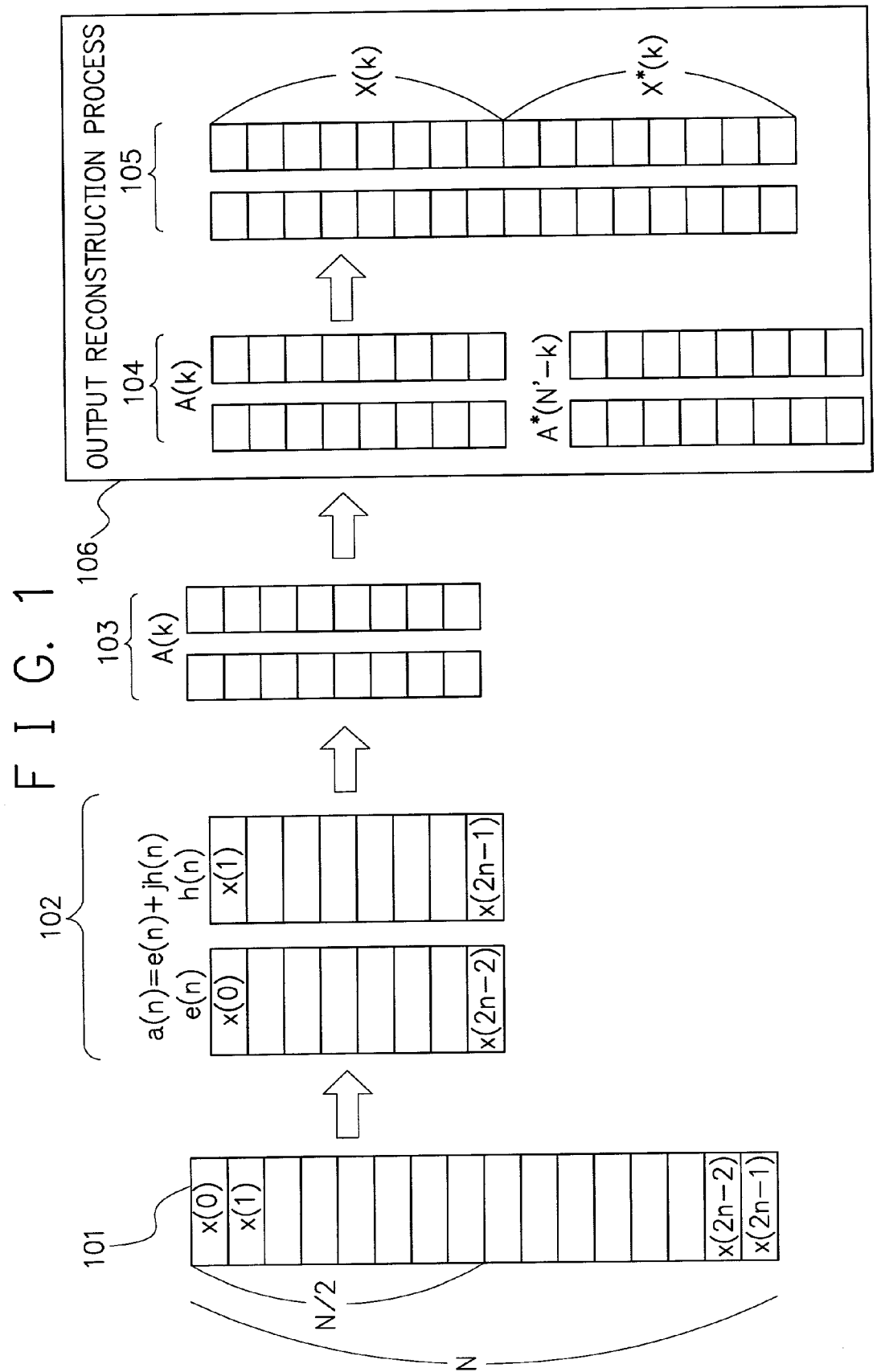
FIG. 1 is a conceptual view showing the principle of a real discrete Fourier transform (RDFT) algorithm.

FIG. 1 is a conceptual view showing the principle of the RDFT algorithm. This algorithm has the following characteristic features.

(1) On the assumption that all input complex data (N data) to be subjected to FFT computations are real numbers, i.e., the all imaginary parts of the input data are 0, the number of data computed is reduced by half (to N/2 data) by performing convolution processing of the real parts of odd-numbered data with respect to the imaginary parts of even-numbered data.

(2) FFT computations for the N/2 data in (1), and more specifically, butterfly computations, are executed to execute a bit-reversed order shuffle process.

(3) Butterfly computations (output reconstruction computations) are performed by using the FFT computation outputs in (2) and their complex conjugates.

The RDFT algorithm is based on the above concept and its principle is derived as follows. Letting x(2n) be even-numbered data of N input real data 101 in FIG. 1, and x(2n+1) be odd-numbered data, complex data a(n) having these data as real and imaginary parts are given by $$a(n) = x(2n) + jx(2n+1) \quad (1)$$

where n is an integer satisfying $0 \leq n < N/2$. In addition, $$e(n) \equiv x(2n), \; h(n) \equiv x(2n+1), \; N' \equiv \frac{N}{2}$$

In this expression, a(n) can be modified into $$a(n) = e(n) + jh(n) \quad (2)$$

This value a(n) corresponds complex data 102 in FIG. 1. If discrete fast Fourier transform (FFT) computation processing of N' is executed with respect to this value a(n), the following equation is obtained:

$$A(k) = \sum_{n=0}^{N'-1} a(n) W_{N'}^{kn} = \sum_{n=0}^{N'-1} [e(n) + jh(n)] W_{N'}^{kn} \quad (3)$$

This value A(k) corresponds to FFT output data 103 in FIG. 1. If $$E(k) \equiv \sum_{n=0}^{N'-1} e(n) W_{N'}^{kn} \quad (4)$$

$$H(k) \equiv \sum_{n=0}^{N'-1} h(n) W_{N'}^{kn}$$

$$W_{N'}^{i} = W_{N}^{2i}$$

then, $$A(k) = \sum_{n=0}^{N'-1} [e(n) + jh(n)] W_{N'}^{kn}$$
$$= E(k) + jH(k), \; 0 \leq k < N'$$

A complex conjugate $A^*(N'-k)$ of the reversal of A(k) is given by $$A^*(N'-k) = \sum_{n=0}^{N'-1} [e(n) - j(W_{N'}^{N'-k})^* h(n)][W_{N'}^{(N'-k)n}]^* \quad (5)$$
$$= \sum_{n=0}^{N'-1} [e(n) - jW_{N'}^{k} h(n)] W_{N'}^{nk}$$
$$= E(k) - jH(k), \; 0 \leq k < N'$$

and can be obtained by inverting the signs of the imaginary parts of A(k). These values A(k) and $A^*(N'-k)$ correspond to data 104 in FIG. 1. On the other hand, X(k) as an RDFT output is given by $$X(k) \equiv \sum_{n=0}^{N-1} x(n) W_{N}^{kn} \quad (6)$$
$$= \sum_{n=0}^{N-1} [x(2n) + x(2n+1)] W_{N}^{kn}$$
$$= \sum_{n=0}^{N-1} [x(2n) W_{N}^{k \cdot 2n} + x(2n+1) W_{N}^{k \cdot (2n+1)}]$$
$$= \sum_{n=0}^{N-1} [e(n) W_{N}^{k \cdot 2n} + h(n) W_{N}^{k \cdot (2n+1)}]$$
$$= E(k) + W_{N}^{k} H(k)$$

If E(k) and H(k) are obtained from equations (4) and (5) and substituted into equation (6), then $$X(k) = E(k) + W_{N}^{k} H(k) \quad (7)$$
$$= \frac{A(k) + A^*(N'-k)}{2} - jW_{N}^{k} \frac{A(k) - A^*(N'-k)}{2}, \; 0 \leq k < N'$$

$X^*(k)$ is the complex conjugate of X(k) and can be obtained by inverting the signs of the imaginary parts of X(k). X(k) and $X^*(k)$ correspond to an RDFT output 105 in FIG. 1. That is, the RDFT output 105 can be obtained from the data 104 by performing an output reconstruction process 106 in FIG. 1.

Figure 3:
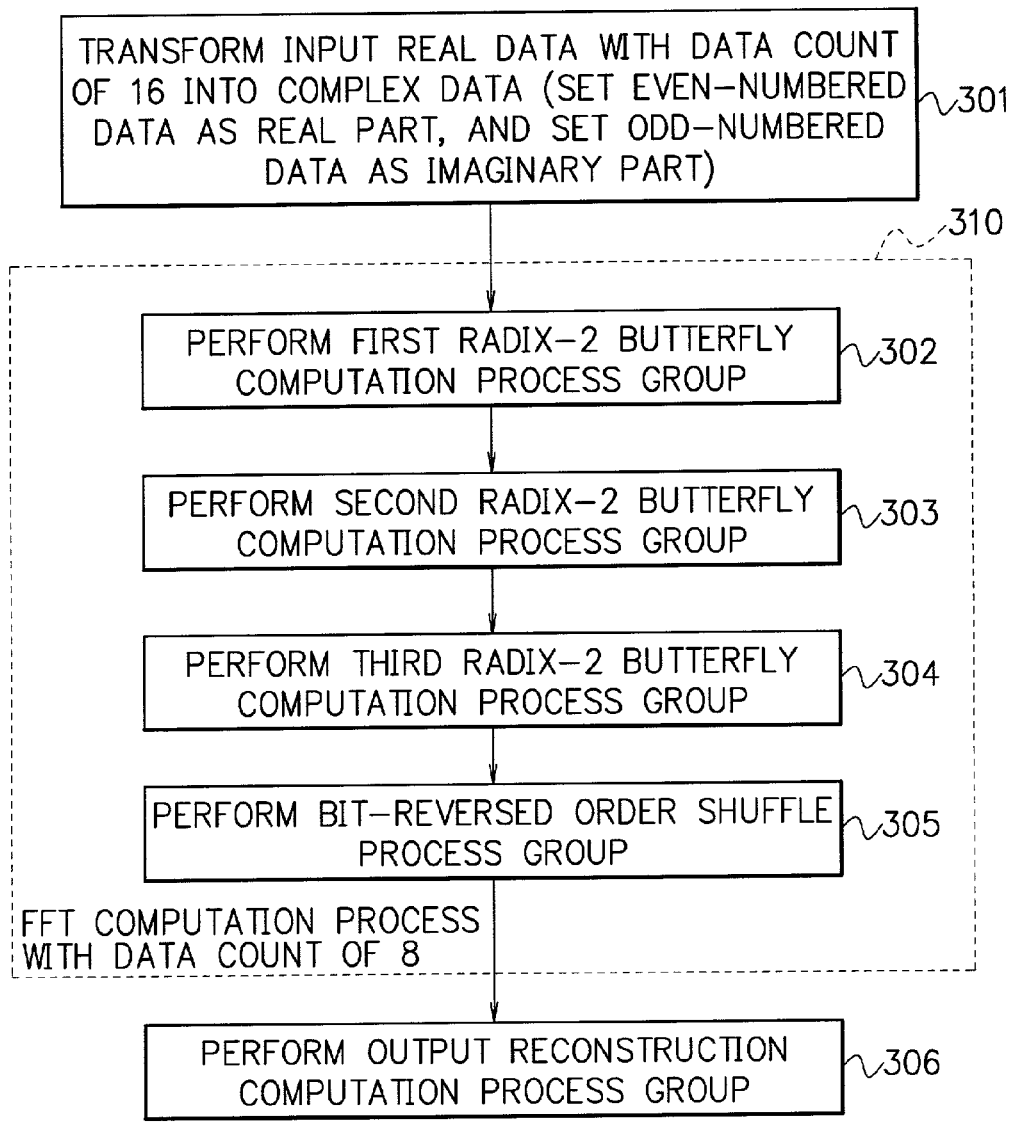
FIG. 3 is a flow chart showing an RDFT computation process sequence.

FIG. 3 is a RDFT computation sequence chart showing an outline of an RDFT process. The RDFT process will be described in detail later with reference to FIG. 5.

In step 301, for example, input real data with a data count of 16 are transformed into complex data. More specifically, the even-numbered input real data x(2n) are set as real parts, and the odd-numbered input real data x(2n+1) are set as imaginary parts. This process corresponds to a transform from the input real data 101 to the complex data 102 in FIG. 1.

In step 310, for example, an FFT computation process with a data count of 8 is performed. This process corresponds to a transform from the complex data 102 to the FFT output data 103 in FIG. 1. Step 310 is constituted by steps 302 to 305.

In step 302, a first radix-2 butterfly computation process group is performed.

In step 303, a second radix-2 butterfly computation process group is performed.

In step 304, a third radix-2 butterfly computation process group is performed.

In step 305, a bit-reversed order shuffle process group is performed.

In step 306, an output reconstruction process group is performed. This process group corresponds to the transform from the FFT output data 103 to the RDFT output 105 in FIG. 1.

Figure 5:
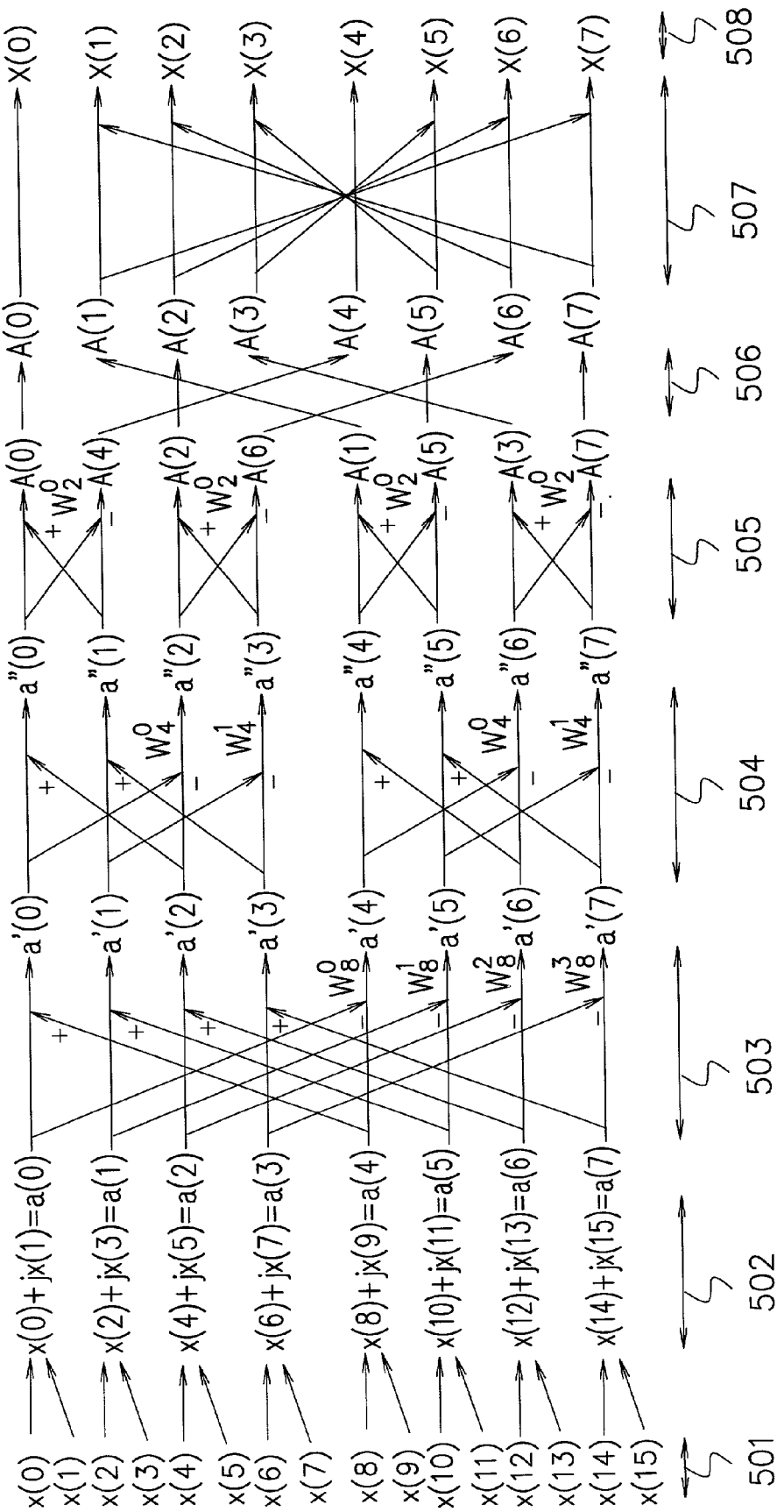
FIG. 5 is an RDFT computation process data flow graph.

FIG. 5 is an RDFT computation process data flow graph. In step 501, the input real data 101 in FIG. 1 are input. Step 502 corresponds to step 301 in FIG. 3, in which the input real data are transformed into complex data. Step 503 corresponds to step 302 in FIG. 3, in which a first radix-2 butterfly computation process group is performed. The butterfly computation process will be described in detail later with reference to FIG. 6. Step 504 corresponds to step 303 in FIG. 3, in which a second radix-2 butterfly computation process group is performed. Step 505 corresponds to step 304 in FIG. 3, in which a third radix-2 butterfly computation process group is performed. Step 506 corresponds to step 305 in FIG. 3, in which a bit-reversed order shuffle process group is performed. This process group will be described in detail later with reference to FIGS. 8A and 8B. Step 507 corresponds to step 306 in FIG. 3, in which an output reconstruction process group is performed. This process group will be described in detail later with reference to FIG. 7. In step 508, RDFT process results are output.

Figure 6:
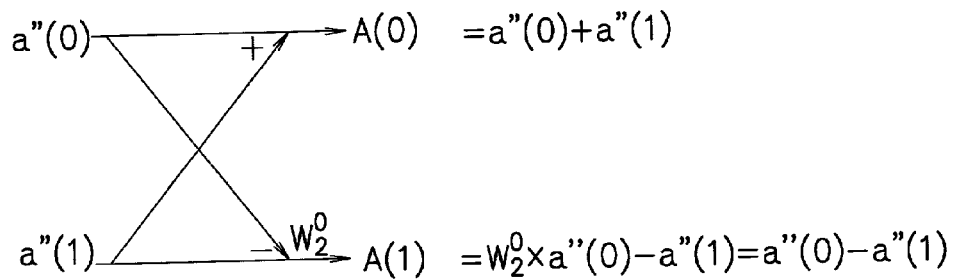
FIG. 6 is a view showing a radix-2 butterfly computation process.

FIG. 6 is a view for explaining the third radix-2 butterfly computation process group to be performed in step 505 in FIG. 5. Butterfly computations in steps 503 and 504 are performed in the same manner.

Data a"(0) and a'(1) are input, and a butterfly computation process is performed to output data A(0) and A(4). The output data A(0) and A(4) are expressed by $$A(0) = a''(0) + a''(1)$$
$$A(4) = W_2^0 \times a''(0) - a''(1)$$
$$= a''(0) - a''(1)$$

where, $W_i^j$ represents a known coefficient in an FFT. For example, $W_2^0$ is +1, $W_2^1$ is −1, $W_4^0$ is +1, $W_4^1$ is −j, $W_4^2$ is −1, and $W_4^3$ is +j.

FIG. 8A shows data A(k) before bit-reversed order shuffle in step 506 in FIG. 5. An ordinal number k of the data A(k) is transformed from a decimal number to a binary number. For example, decimal numbers from 0 to 7 can be expressed by 3-bit binary numbers b2, b1, and b0. If these 3-bit binary numbers are shuffled in a bit-reversed order, the data shown in FIG. 8B are obtained. More specifically, the most significant bit b2 is replaced with the least significant bit b0. The shuffled binary numbers are transformed into decimal numbers. By shuffling A(k) with the ordinal numbers k of the decimal numbers, a bit-reversed shuffle process can be performed.

Figure 7:
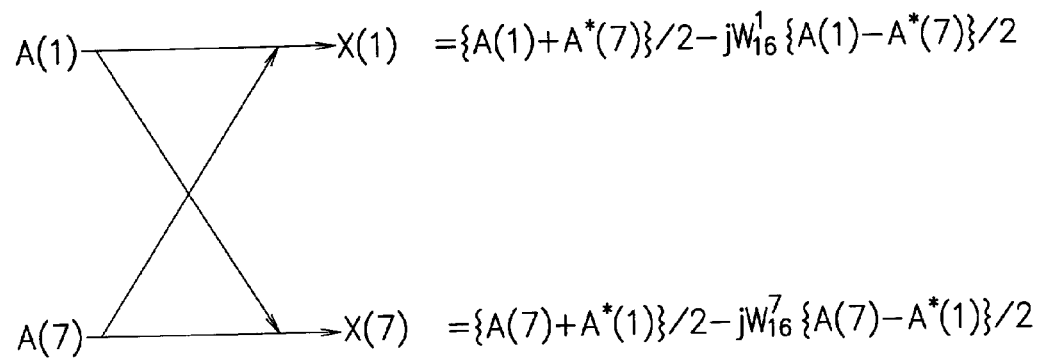
FIG. 7 is a view showing an output reconstruction process.

FIG. 7 is a view for explaining the output reconstruction computation process in step 507 in FIG. 5.

Data A(1) and A(7) are input, and a butterfly computation process is performed to output data X(1) and X(7). For a simple illustration, the input data A(1) indicates A(1) and A*(1). A*(1) is the complex conjugate of A(1) and obtained by inverting the sign of the imaginary part of A(1). Likewise, the input data A(7) indicates A(7) and its complex conjugate A(7)

The output data X(1) and X(7) are given by $$X(1)=\{A(1)+A^*(7)\}/2-jW_{16}^1\{A(1)-A^*(7)\}/2$$

$$X(7)=\{A(7)+A^*(1)\}/2-jW_{16}^7\{A(7)-A^*(1)\}/2$$

As described above, the RDFT algorithm can be implemented by an algorithm having an input data convolution process and the output reconstruction computation process represented by equation (7) in addition to the FFT computation process with a data count N/2.

Figure 4:
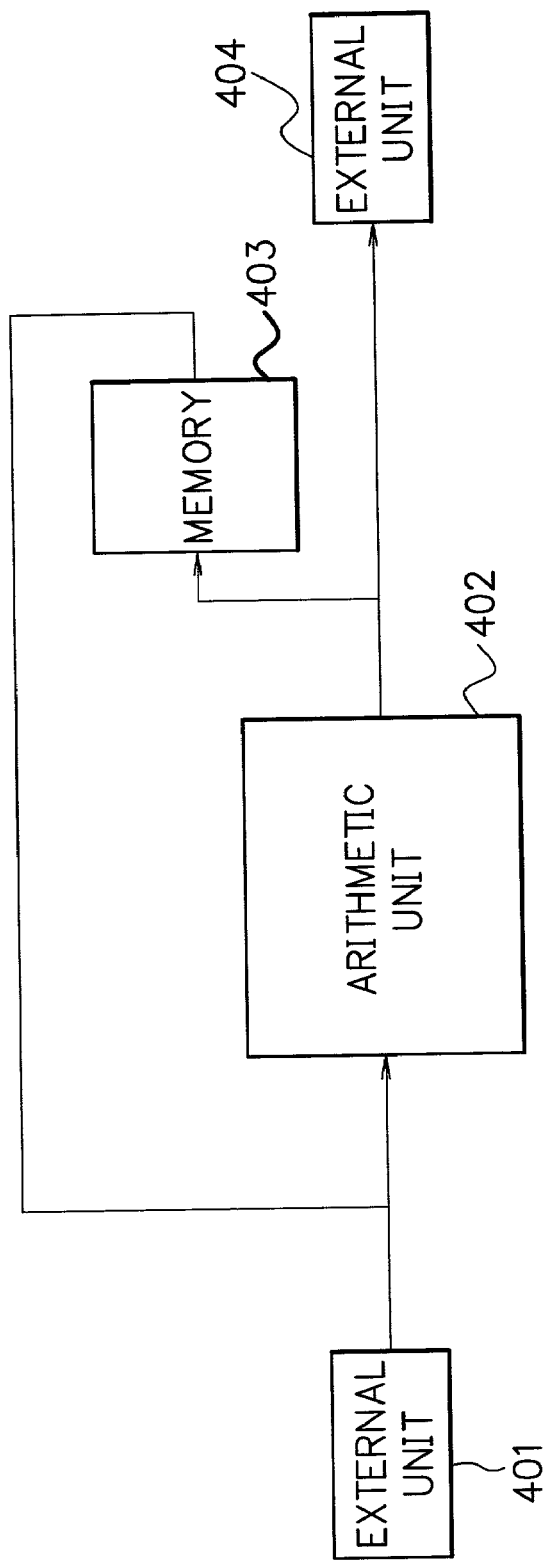
FIG. 4 is a conceptual view of an RDFT processing apparatus.

FIG. 4 is a conceptual view of an RDFT processing apparatus. The output of an external unit 401 is connected to the input port of an arithmetic unit 402. The output port of the arithmetic unit 402 is connected to the write port of a memory 403 and external unit 404. The read port of the memory 403 is connected to the input port of the arithmetic unit 402. The arithmetic unit 402 includes at least an adder and multiplier. Subtractions can be performed by the adder, and divisions can be performed by bit shifting.

Figure 2:
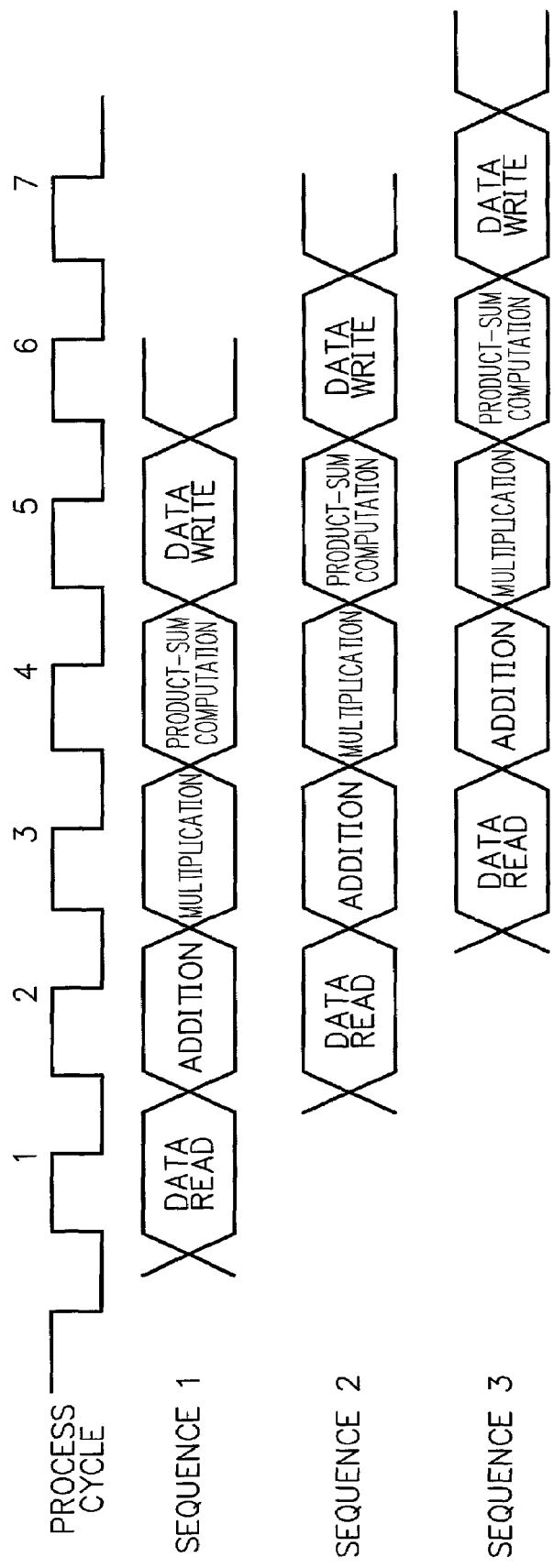
FIG. 2 is a pipeline sequence control chart.

In this embodiment, data is read out one by one from the external unit 401 or memory 403, the readout data is processed, and the resultant output data is written in the memory 403. This sequence is sequentially and repeatedly executed as one unit with respect to all the data under pipeline sequence control like that shown in FIG. 2, thereby performing one computation process group. Furthermore, the above sequence is executed as one unit for all the computation process groups required for RDFT computations, thus deriving computation outputs. This makes it possible to avoid concurrent execution of computations of the same kind in the same cycle, thus minimizing the number of arithmetic units mounted.

A method of increasing the processing speed will be described next. This apparatus uses a means for decreasing the number of process cycles for one process group, instead of using a means for concurrently executing a computation process group in which a larger number of arithmetic units are required. That is, the apparatus can decrease the number of process cycle by simultaneously executing two process groups executed by the RDFT computation process in FIG. 3 in a sequence as one unit. More specifically, the apparatus uses a means for decreasing the number of process cycles required for the bit-reversed order shuffle process group 305 by executing the bit-reversed order shuffle process group 305 in FIG. 3, which includes no computation processing, and an output reconstruction computation process group 306 to be executed later in a sequence as one unit, or simultaneously executing the bit-reversed order shuffle process group 305 and a third radix-2 butterfly computation process group 304 to be executed before the bit-reversed order shuffle process group 305 in FIG. 3 in a sequence as one unit. In this case, since the bit-reversed order shuffle process group 305 is implemented by reading out data from the memory 403 or read/write control, the independent bit-reversed order shuffle process group 305 can be omitted.

That is, the number of computation process groups in the RDFT computation process sequence in FIG. 3 is decreased from 6 to 5. In an FFT computation process 310, the number of computation process groups decreases from 4 to 3. The number of process cycles in an RDFT processing apparatus decreases 16%, and that in an FFT processing apparatus decreases 25% as compared with an apparatus that does not have the above speedup means.

With the above means, the number of process cycles required for bit-reversed order shuffle process group can be decreased with a minimum number of arithmetic units mounted, i.e., an RDFT processing apparatus and FFT processing apparatus with higher processing speeds can be provided. By providing such a unit, the price of an LSI can be decreased with a small mount area, and the LSI processing capability can be improved with a reduction in the number of process cycles.

To facilitate the understanding of a process sequence in more detail, the contents of each computation process group will be described next with reference to FIG. 5. Consider the overall flow of process data. Input read data with a data count of 16 input from the external unit 401 are transformed into complex data with a data count of 8. After a radix-2 butterfly computation process group is executed three times and a bit-reversed order shuffle process group, i.e., an FFT computation process with a data count of 8, is executed, an output reconstruction computation processing group is executed to calculate an RDFT computation result, and the result is output to the external unit 404. In this case, the word "process group" indicates a set of processes that are sequentially and repeatedly executed one by one a plurality of number of times. The radix-2 butterfly computation process groups indicates the computation process in FIG. 6, and the output reconstruction computation process group indicates that the computation processes in FIG. 7 are sequentially and repeatedly executed one by one. Note that all the process data in the course of computation are read/written from/in the memory 403, and all data in each process group are input to or output from the memory 403 until a computation result is obtained.

The contents of a bit-reversed order shuffle process group will be described next. Data having undergone butterfly computations are output in an order different from a desired order. The order of the output data can be changed to the desired order by replacing one most significant bit with one least significant bit and shuffling the resultant data in accordance with decimal ordinal numbers. This shuffle process is called bit-reversed order shuffle. FIGS. 8A and 8B illustrate the above description. As is obvious from FIGS. 8A and 8B, the ordinal numbers of the decimal butterfly computation outputs on the left are changed to the decimal numbers on the right after a bit-reversed order shuffle process. As a consequence, the ordinal numbers are shuffled with, for example, 0 changing to 0, 1 to 4, 2 to 2, 3 to 6.

Figure 9:
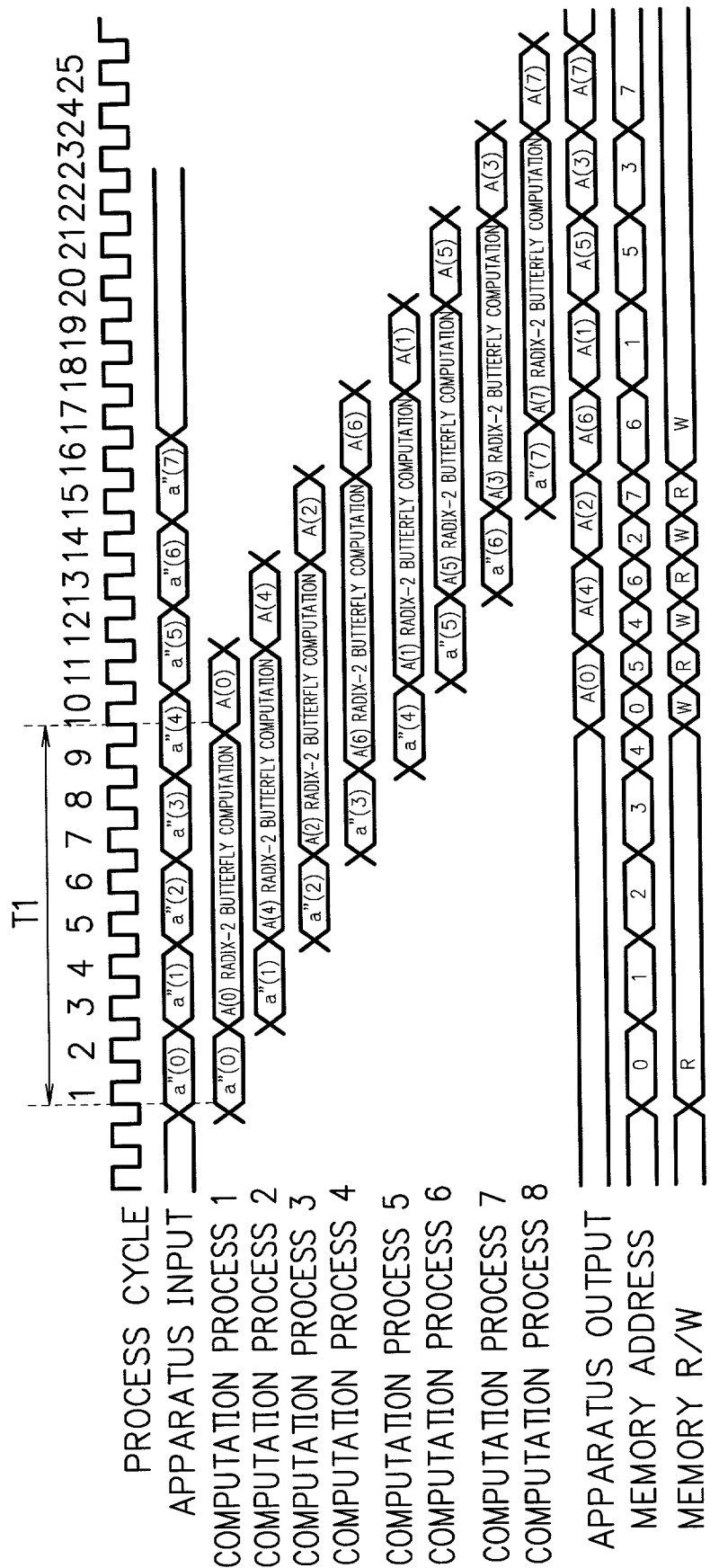
FIG. 9 is a timing chart of the simultaneous execution of a third radix-2 butterfly computation process group and a bit-reversed order shuffle process group.

A process sequence in the processing apparatus according to this embodiment will be described below in consideration of the contents of each process group described above. FIG. 9 shows a process sequence in simultaneous execution of the third butterfly computation process group 304 and bit-reversed order shuffle process group 305 in FIG. 3. FIG. 9 shows the timing of the execution of each process. FIGS. 10A to 10I show how the data in the memory 403 in FIG. 4 changes. The timing chart of FIG. 9 show a process cycle indicating the concept of time, data on the input port of the arithmetic unit 402, each computation process, data on the output port of the arithmetic unit 402, data on an address line of the memory 403, and data on a memory R/W line which is a memory read/write instruction.

FIGS. 10A to 10I are views showing changes in memory data, i.e., showing how the data stored in the memory change. FIG. 10A shows stored data before the start of the third butterfly computation process. FIGS. 10B to 10H show changes in stored data that are written in the memory in W intervals of the memory R/W data. FIG. 10I shows stored data after the computation process.

The process sequences will be described in detail. In process cycles 1 and 2, a"(0) is sequentially loaded from address 0 of the memory into the arithmetic unit 402. In cycles 3 to 9, a butterfly computation process with radix 2 of A(0) is executed. In cycle 10, the computation output A(0) is written in the memory 403, thus completing one computation process. These three sequences regarded as one unit are sequentially and repeatedly executed for all the data by pipeline processing. Note that the processing apparatus according to this embodiment executes process sequences like those described above with respect to all other RDFT computation process groups.

Referring to FIG. 9, in process cycle 9, data a"(4) is read out from address 4. In process cycle 10, as shown in FIG. 10B, data A(0) is written at address 0. In process cycle 11, data a"(5) is read out from address 5. In process cycle 12, as shown in FIG. 10C, data A(4) is written at address 4. In process cycle 13, data a"(6) is read out from address 6. In process cycle 14, as shown in FIG. 10D, data A(2) is written at address 2. In process cycle 15, data a"(7) is read out from address 7. In process cycle 16, as shown in FIG. 10E, data A(6) is written at address 6. Subsequently, in process cycles 18, 20, 22, and 24, as shown in FIGS. 10F, 10G, 10H, and 10I, data A(1), A(5), A(3), and A(7) are written at addresses 1, 5, 3, and 7, respectively.

A process speedup means as a characteristic feature of this embodiment will be described next. A general FFT computation process takes a computation process form called an in-place computation. A characteristic feature of this process is that output data after a computation process are written in the memory at the same memory addresses as those input data read out from the memory. Owing to this characteristic feature, in an FFT computation process, when computation output data are to be written in the memory, there is no need to worry about overwriting unprocessed data stored in the memory.

If, however, a bit-reversed order shuffle process group, which is a data shuffle process, is executed concurrently with preceding and succeeding computation process groups, since this computation form differs from the in-place computation form, the unprocessed data in the memory may be overwritten with computation output data.

In the processing apparatus according to this embodiment, to avoid this problem, a delay T1 of several cycles, i.e., a so-called latency, is set between a data read and a computation output write, and the value of this delay T1 is adjusted to prevent computation output data from overwriting the unprocessed data in the memory. FIG. 9 shows a case where a third radix-2 butterfly computation process group and bit-reversed order shuffle process group are simultaneously executed by the processing apparatus having this means. As is obvious from changes in memory data in FIGS. 10A to 10I, the outputs obtained by the second radix-2 butterfly computation process group which are stored in the memory before the process (FIG. 10A) become those obtained by the third radix-2 butterfly computation process group with the order of the data being that set after the bit-reversed order shuffle process after the process (FIG. 10I).

FIG. 11 shows a case where the bit-reversed order shuffle process group 305 and output reconstruction computation process group 306 in FIG. 3 are simultaneously executed. The arithmetic unit 402 reads out the data A(0), A(4), A(1), A(7), A(2), A(6), A(3), and A(5) from addresses 0, 1, 4, 7, 2, 3, 6, and 5 in the memory 403 in process cycles 1, 3, 5, 7, 9, 11, 13, and 15. In computation process 3, as shown in FIG. 5, the data X(1) is output on the basis of the data A(1) and A(7). That is, the data A(1) and A(7) must be sequentially read out. The sequence of data read from the memory 403 is controlled in consideration of the order of data required for such a computation and inhibition of the overwriting of necessary data. In the case shown in FIG. 9 as well, the read sequence must be controlled in the same manner.

FIG. 12A shows the contents of the memory 403 before the execution of the bit-reversed order shuffle process group 305 and output reconstruction computation process group 306. In process cycles 10, 12, 14, 16, 18, 20, 22, and 24, as shown in FIGS. 12B, 12C, 12D, 12E, 12F, 12G, 12H, and 12I, data X(0) X(4), X(1), X(7), X(2), X(6), X(3), and X(5) are written at addresses 0, 4, 1, 7, 2, 6, 3, and 5, respectively.

The results obtained by the third radix-2 butterfly computation process group are stored in the memory in FIG. 12A before the start of this sequence as one unit, and the RDFT output results are stored in the memory in FIG. 12I after the end of the process.

In this case, similar to the case shown in FIG. 9, the processing speed can be increased without overwriting the unprocessed data in the memory 403 by simultaneously executing the bit-reversed order shuffle process group 305 and output reconstruction computation process group 306 in FIG. 3.

FIG. 13 is a view showing a real inverse discrete Fourier transform (RIDFT) computation process sequence. The RIDFT is the inverse of the RDFT and can be implemented by executing the above RDFT algorithm in inverse order.

Step 1301 corresponds to step 306 in FIG. 3, in which an output reconstruction computation process group is performed. Step 1310 corresponds to step 310 in FIG. 3, in which an FFT computation process with a data count of 8 is executed. Step 1310 is constituted by steps 1302 to 1305. In step 1302, a first radix-2 butterfly computation process group is performed. In step 1303, a second radix-2 butterfly computation process is performed. In step 1304, a third radix-2 butterfly computation process is performed. In step 1305, a bit-reversed order shuffle process group is performed.

As in the RDFT, in the RIDFT, the processing speed can be increased by simultaneously executing bit-reversed order shuffle process group 1305 and immediately preceding or succeeding process. That is, the bit-reversed order shuffle process group 1305 and an immediately preceding third radix-2 butterfly computation process 1304 can be simultaneously executed, or the bit-reversed order shuffle process group 1305 and an immediately succeeding process can be simultaneously executed.

Referring to FIG. 3, the RDFT includes the FFT computation process 310. Referring to FIG. 13, the RIDFT includes an FFT computation process 1310. That is, this embodiment can also be applied to an independent FFT process. More specifically, in the FFT, a bit-reversed order shuffle process group and an immediately preceding third radix-2 butterfly computation process group can be simultaneously executed, or a bit-reversed order shuffle process group and an immediately succeeding process can be simultaneously executed.

According to this embodiment, RDFT, RIDFT, and FFT processing apparatuses can be provided, in which the number of arithmetic units mounted can be minimized, and the number of process cycles required for a bit-reversed order shuffle process group can be decreased. Such a processing apparatus can be used in a digital signal processing apparatus such as a modem.

Referring to FIG. 3, for example, the processing speed is decreased by writing the results obtained by the third butterfly computation process group 304 in the memory, performing the bit-reversed order shuffle process group 305 for the data in the memory, writing the resultant data in the memory again, and then performing the output reconstruction computation process group 306. According to this embodiment, the processing speed can be increased by performing a bit-reversed order shuffle process at the time of a data write/read in/from the memory.

A method of performing concurrent processing by using many arithmetic units may be used to increase the processing speed. If, however, the attainment of a predetermined processing speed will suffice, the size and cost of a processing apparatus can be reduced by minimizing the number of arithmetic units. According to this embodiment, since pipeline processing can be performed, RDFT, RIDFT, and FFT processes can be executed with a minimum number of arithmetic units and a minimum number of process cycles up to the acquisition of a computation result.

This embodiment can be implemented by making a computer execute a program. In addition, a means for supplying the program to a computer, e.g., a recording medium such as a CD-ROM on which the program is recorded and a transmission medium such as the Internet for transmitting the program can also be applied as embodiments of the present invention. The above program, recording medium and transmission medium fall within the scope of the present invention.

The above embodiment is a mere example of the present invention and should not be construed to limit the technical range of the present invention. That is, the present invention can be practiced in various forms without departing from its technical spirit and scope or major features.

As described above, the processing speed increases by performing a bit-reversed order shuffle process at the time of a data write/read in/from a memory. In addition, since pipeline processing can be performed, the number of process cycles up to the acquisition of computation results can be decreased with a small number of arithmetic units.

What is claimed is:

1. A processing apparatus comprising:
   a memory capable of storing data;
   a butterfly arithmetic unit for performing butterfly computation processes; and
   a bit-reversed order shuffle processing unit for writing results obtained by the butterfly computation processes performed by said butterfly arithmetic unit at addresses in said memory after bit-reversed order shuffle instead of writing the results at addresses in said memory in processing order,
   wherein data written by said bit-reversed order shuffle processing unit are discrete fast Fourier transform results and wherein
   said processing apparatus further comprises
   a complex conjugate data transforming unit for transforming input real data into complex data, and
   an output reconstruction arithmetic unit for reading out the data written in said memory by said bit-reversed order shuffle processing unit and performing an output reconstruction computation process, wherein
   said butterfly arithmetic unit performs a butterfly computation process for the complex conjugate data, and
   output reconstruction computation process results obtained by said output reconstruction arithmetic unit are real discrete Fourier transform results.

2. A processing apparatus comprising:
   a memory capable of storing data;
   a butterfly arithmetic unit for performing butterfly computation processes; and
   a bit-reversed order shuffle processing unit for writing results obtained by the butterfly computation processes performed by said butterfly arithmetic unit at addresses in said memory after bit-reversed order shuffle instead of writing the results at addresses in said memory in processing order,
   wherein data written by said bit-reversed order shuffle processing unit are discrete fast Fourier transform results and wherein
   said processing apparatus further comprises an output reconstruction arithmetic unit for performing an output reconstruction computation process, wherein
   said butterfly arithmetic unit performs a butterfly computation process for the data having undergone the output reconstruction computation process, and the data written by said bit-reversed order shuffle processing unit are real inverse discrete Fourier transform results.

3. A processing apparatus comprising:
a memory capable of storing data;
a butterfly arithmetic unit for performing butterfly computation processes; and
a bit-reversed order shuffle processing unit for writing results obtained by the butterfly computation processes performed by said butterfly arithmetic unit at addresses in said memory after bit-reversed order shuffle instead of writing the results at addresses in said memory in processing order,
wherein data written by said bit-reversed order shuffle processing unit are discrete fast Fourier transform results and wherein
said butterfly arithmetic unit reads out data from said memory and performs a butterfly computation process, and
said bit-reversed order shuffle processing unit leaves necessary data to be read out from said memory by said butterfly arithmetic unit afterward and overwrites the butterfly computation process results at addresses of unnecessary data that have already been read out.

4. The processing apparatus according to claim 3, wherein said butterfly arithmetic unit controls a read sequence of data from said memory so as to prevent said bit-reversed order shuffle processing unit from overwriting the necessary data.

5. A processing apparatus comprising:
a butterfly arithmetic unit for performing butterfly computation processes and writing results obtained by the butterfly computation processes in a memory; and
a bit-reversed order shuffle processing unit for reading out the results obtained by the butterfly computation processes and written in the memory from addresses in the memory upon bit-reversed order shuffle,
wherein data read out by said bit-reversed order shuffle processing unit are discrete fast Fourier transform results and wherein
said processing apparatus further comprises
a complex conjugate data transforming unit for transforming input real data into complex data, and
an output reconstruction arithmetic unit for performing an output reconstruction computation process for the data read out by said bit-reversed order shuffle processing unit, wherein
said butterfly arithmetic unit performs a butterfly computation process for the complex conjugate data, and
output reconstruction computation process results obtained by said output reconstruction arithmetic unit are real discrete Fourier transform results.

6. A processing apparatus comprising:
a butterfly arithmetic unit for performing butterfly computation processes and writing results obtained by the butterfly computation processes in a memory; and
a bit-reversed order shuffle processing unit for reading out the results obtained by the butterfly computation processes and written in the memory from addresses in the memory upon bit-reversed order shuffle,
wherein data read out by said bit-reversed order shuffle processing unit are discrete fast Fourier transform results and wherein
said processing apparatus further comprises an output reconstruction arithmetic unit for performing an output reconstruction computation process, wherein said butterfly arithmetic unit performs a butterfly computation process for the data having undergone the output reconstruction computation process, and
the data read out by said bit-reversed order shuffle processing unit are real inverse discrete Fourier transform results.

7. A processing apparatus comprising:
a butterfly arithmetic unit for performing butterfly computation processes and writing results obtained by the butterfly computation processes in a memory;
a bit-reversed order shuffle processing unit for reading out the results obtained by the butterfly computation processes and written in the memory from addresses in the memory upon bit-reversed order shuffle; and
a post-processing unit for processing the data read out by said bit-reversed order shuffle processing unit,
wherein data read out by said bit-reversed order shuffle processing unit are discrete fast Fourier transform results.

8. The processing apparatus according to claim 7, wherein said post-processing unit leaves necessary data to be read out from said memory by said bit-reversed order shuffle processing unit afterward and overwrites process results at addresses of unnecessary data that have already been read out.

9. The processing apparatus according to 8, wherein said bit-reversed order shuffle processing unit controls a read sequence of data from said memory so as to prevent said post-processing unit from overwriting the necessary data.

10. A processing apparatus for executing a sequence of reading out data one by one from an external unit or a memory, performing a series of computation processes including a discrete fast Fourier transform process for the data, and writing the data in the memory, as one unit, with respect to all the data sequentially and repeatedly under pipeline sequence control adjusted to inhibit concurrent execution of computations of the same type, thereby processing one computation process group, and deriving computation results by continuously executing the series of computation processes, comprising:
an arithmetic unit for executing a computation of input data; and
a memory for storing a computation result obtained by said arithmetic unit,
wherein said arithmetic unit has a process latency until the input data is input and processed and the process result is output, the process latency being a time adjusted to inhibit data in the memory which is required for a subsequent computation process during a computation process from being overwritten by output data, and
a bit-reversed order shuffle process group and an immediately preceding or succeeding process group are processed in a sequence as one unit by said arithmetic unit having the process latency.

11. The processing apparatus according to claim 10, wherein a bit-reversed order shuffle process group of a discrete fast Fourier transform process and an immediately preceding butterfly computation process group are processed in a sequence as one unit.

12. The processing apparatus according to claim 11, wherein a real discrete Fourier transform is performed.

13. The processing apparatus according to claim 11, wherein a real inverse discrete Fourier transform is performed.

14. The processing apparatus according to claim 10, wherein a bit-reversed order shuffle process group of a real discrete Fourier transform process and an immediately succeeding output reconstruction computation process group are processed in a sequence as one unit.

15. A processing method comprising:
providing a memory capable of storing data;
transforming input real data into complex data;
performing butterfly computation processes for the complex conjugate data;
bit-reversed order shuffle processing the results obtained by the butterfly computation process to obtain discrete fast Fourier transform results;
writing the discrete fast Fourier transform results at addresses in the memory instead of writing the results of the butterfly computation processes at addresses in the memory in processing order;
reading out the discrete fast Fourier transform data written in the memory; and
output reconstruction computation processing the discrete fast Fourier transform data read from the memory to obtain real discrete fast Fourier transform results.

16. A processing method comprising:
providing a memory capable of storing data;
performing an output reconstruction computation process;
butterfly computation processing data having undergone the output reconstruction computation process;
bit-reversed order shuffle processing the results obtained by the butterfly computation process to obtain real inverse discrete fast Fourier transform results; and
writing the real inverse discrete Fourier transform results at addresses in the memory instead of writing the results of the butterfly computation processes at addresses in the memory in processing order.

17. A processing method comprising:
providing a memory capable of storing data;
reading data from the memory;
butterfly computation processing the data read from the memory;
bit-reversed order shuffle processing the results obtained by the butterfly computation process to obtain discrete fast Fourier transform results; and
writing the discrete fast Fourier transform results at addresses of unnecessary data in the memory instead of writing the results of the butterfly computation processes at addresses in the memory in processing order, the addresses of unnecessary data are addresses for data that has been already been read out and butterfly computation processed, wherein necessary data for the butterfly computation processing is not overwritten.

18. A processing method comprising:
transforming input real data into complex data
butterfly computation processing the complex conjugate data and writing results obtained by the butterfly computation processes in a memory;
reading the results from the memory using a bit-reversed order shuffle process to obtain discrete fast Fourier transform results; and
performing an output reconstruction computation process on the discrete fast Fourier transform results to obtain real discrete fast Fourier transform results.

19. A processing method comprising:
performing an output reconstruction computation process;
butterfly computation processing data having undergone the output reconstruction computation process;
writing results obtained by the butterfly computation processes in a memory; and
reading out the results obtained by the butterfly computation processes and written in the memory from addresses in the memory using a bit-reversed order shuffle process to obtain real inverse discrete fast Fourier transform results.

20. A processing method comprising:
performing butterfly computation processes and writing results obtained by the butterfly computation processes in a memory;
reading out the results obtained by the butterfly computation processes and written in the memory from addresses in the memory upon bit-reversed order shuffle; and
processing the data read out in said bit-reversed order shuffle, wherein
said data read out in said bit-reversed order shuffle are discrete fast Fourier transform results.

* * * * *